(12) United States Patent
Tseng et al.

(10) Patent No.: US 9,471,106 B2
(45) Date of Patent: Oct. 18, 2016

(54) COMPUTER APPARATUS

(71) Applicant: Wistron Corporation, New Taipei (TW)

(72) Inventors: Tien-Chung Tseng, New Taipei (TW); Chen-Yi Liang, New Taipei (TW); Hung-Chih Chen, New Taipei (TW)

(73) Assignee: Wistron Corporation, New Taipei (TW)

( * ) Notice: Subject to any disclaimer, the term of this patent is extended or adjusted under 35 U.S.C. 154(b) by 0 days.

(21) Appl. No.: 14/823,564

(22) Filed: Aug. 11, 2015

(65) Prior Publication Data
US 2015/0346769 A1    Dec. 3, 2015

Related U.S. Application Data

(62) Division of application No. 13/921,381, filed on Jun. 19, 2013, now Pat. No. 9,189,015.

(30) Foreign Application Priority Data

Sep. 4, 2012    (TW) .............................. 101132148 A

(51) Int. Cl.
*G06F 1/16*    (2006.01)

(52) U.S. Cl.
CPC ................ *G06F 1/1637* (2013.01); *G06F 1/16* (2013.01); *G06F 1/1616* (2013.01); *G06F 1/1624* (2013.01); *G06F 1/1656* (2013.01); *G06F 1/1679* (2013.01); *G06F 1/1681* (2013.01)

(58) Field of Classification Search
CPC .. G06F 1/1637; G06F 1/1681; G06F 1/1679; G06F 1/1656; G06F 1/1624; G06F 1/1616; G06F 1/16

USPC .......................... 361/361.27, 361.55, 361.03
See application file for complete search history.

(56) References Cited

U.S. PATENT DOCUMENTS

| | | | |
|---|---|---|---|
| 4,331,101 A | 5/1982 | Muller et al. | |
| 6,108,868 A * | 8/2000 | Lin | G06F 1/1616 16/327 |

(Continued)

FOREIGN PATENT DOCUMENTS

| | | |
|---|---|---|
| CN | 1908850 | 2/2007 |
| CN | 201583860 | 9/2010 |

(Continued)

OTHER PUBLICATIONS

English Abstract of TW M372608; one page.

(Continued)

*Primary Examiner* — Tuan T Dinh
*Assistant Examiner* — Rockshana Chowdhury
(74) *Attorney, Agent, or Firm* — Jianq Chyun IP Office

(57) ABSTRACT

A computer apparatus includes a base and a display device. The base includes a first casing and a ferromagnetic unit fastened to the first casing. The display device includes a second casing having a connecting side portion and a magnetic unit. In a first use state, the connecting side portion of the second casing is adjacent to the first casing of the base, and an angle formed therebetween is adjustable. The magnetic unit is fastened to the connecting side portion of the second casing, and magnetically attracts ferromagnetic unit of the base, thereby permitting sliding of the display device relative to the base without separating therefrom.

11 Claims, 14 Drawing Sheets

(56) References Cited

U.S. PATENT DOCUMENTS

| | | | |
|---|---|---|---|
| 6,862,171 B1 * | 3/2005 | Maskatia | G06F 1/1616 312/223.2 |
| 7,184,263 B1 | 2/2007 | Maskatia | |
| 7,831,286 B2 | 11/2010 | Cho et al. | |
| 2003/0206394 A1 | 11/2003 | Ossia | |
| 2004/0140410 A1 | 7/2004 | Tsai | |
| 2005/0041381 A1 | 2/2005 | Maskatia et al. | |
| 2006/0109677 A1 * | 5/2006 | Hou | H04M 1/0237 362/561 |
| 2006/0243879 A1 | 11/2006 | Chiu | |
| 2007/0217135 A1 | 9/2007 | Chuang et al. | |
| 2010/0058557 A1 * | 3/2010 | Wang | G06F 1/1616 16/320 |
| 2010/0238620 A1 | 9/2010 | Fish | |
| 2012/0200990 A1 | 8/2012 | Fyke | |

FOREIGN PATENT DOCUMENTS

| | | |
|---|---|---|
| CN | 201583860 Y * | 9/2010 |
| TW | M255430 | 1/1993 |
| TW | 566597 | 1/2003 |
| TW | 590266 | 6/2004 |
| TW | I259716 | 4/2006 |
| TW | M372608 U1 | 1/2010 |

OTHER PUBLICATIONS

English Abstract of TW 590266; one page.
"Office Action of China Counterpart Application" with partial English translation, issued on May 4, 2016, p. 1-p. 9.

* cited by examiner

COMPUTER APPARATUS

CROSS-REFERENCE TO RELATED APPLICATION

This application is a divisional application of U.S. patent application Ser. No. 13/921,381 filed on Jun. 19, 2013, which claims priority of Taiwanese Application No. 101132148, filed on Sep. 4, 2012. The disclosures of both are incorporated herein by reference.

BACKGROUND OF THE INVENTION

1. Field of the Invention

The invention relates to a computer apparatus, more particularly to a computer apparatus having a display device slidable with respect to a base.

2. Description of the Related Art

The main components of a notebook computer or a tablet PC with an expansion device includes a base and an adjustable display screen for adjusting the operational angle of the display screen with respect to the base. A current base for a notebook computer is a host used with a keyboard unit. A current base for a tablet PC is an accessory adapted for connecting a keyboard module and/or a charging module to the tablet PC.

Generally speaking, the base and the display screen are pivotally interconnected. Various designs have emerged in the market, including ones with display screens slidable relative to a base. However, the sliding mechanism in most of those slidable designs relies on providing slide grooves in the base, and wheels on the display screen.

SUMMARY OF THE INVENTION

The object of the present invention is to provide a computer apparatus that uses magnetism to enable relative sliding movement between a base and a display screen.

According to the present invention, there is provided a computer apparatus comprising a base and a display device.

The base includes a first casing and a ferromagnetic unit disposed on the first casing.

The display device is slidably disposed on and above the base, and includes a second casing that has a connecting side portion, a display panel disposed on the second casing, and a magnetic unit fastened to the connecting side portion of the second casing for attracting the ferromagnetic unit. In a first use state of the computer apparatus, the connecting side portion of the second casing is connected to the first casing of the base at an operational angle. Specifically, the ferromagnetic unit of the first casing and the magnetic unit of the second casing are magnetically attracted to each other to prevent separation of the display device from the base.

The display device further includes a plurality of spaced-apart wheels installed along the connecting side portion of the second casing to facilitate the sliding movement of the display device relative to the base. A surface of each of the wheels slightly protrudes from the connecting side portion. Further, the plurality of wheels and the magnetic unit may be integrated as a single entity.

The magnetic unit of the display device includes a plurality of cylindrical magnet members fastened to the connecting side portion. The width between the ferromagnetic units of the first casing is not smaller than the distance between outer ends of two outermost ones of the cylindrical magnet members of the second casing.

The ferromagnetic unit is an iron plate disposed on the first casing. Alternatively, the ferromagnetic unit is a magnetic layer formed on a surface of the first casing, for example, by electroplating, laying iron powder on, or laying magnetic powder on the surface of the first casing.

The computer apparatus further comprises a support frame having two ends respectively and pivotally connected to a rear end of the first casing of the base and the display device the display device.

The computer apparatus further comprises first and second slide seats disposed, respectively, on first and second sides of the base and pivotally connected to the display device. The first casing of the base has an upper surface, first and second side surfaces connected, respectively, to first and second opposing sides of the upper surface, and first and second slide slots formed respectively in the first and second side surfaces in a front-rear direction. Each of the slide seats has an upper plate body superposed on the upper surface of the base, a lower plate body extending into a respective one of the first and second slide slots, and a connecting plate body connecting the upper plate body to the lower plate body. Further, each of the first and second slide seats is equipped with a bearing disposed on the upper plate body that has a hole.

The display device further includes first and second side support rods fixedly and respectively coupled to first and second opposing sides of the second casing, first and second pivot rods protruding respectively from the first and second side support rods toward each other and adjacent to the connecting side portion of the second casing, and a plurality of washers sleeved on each of the first and second pivot rods. Each of the first and second pivot rods respectively extends through the hole of a corresponding one of the bearings such that at least two of the washers are clamped between one of the bearings and a corresponding one of the first and second side support rods. The washers provide a frictional resistance between the first and second side support rods and the bearings for maintaining an operational angle between the display device and the base. Each of the bearings is disposed on a front end of the upper plate body of the respective one of the first and second slide seats, and is further equipped with a lock bolt that extends through a rear end of the upper plate body of the corresponding one of the first and second slide seats for maintaining the position of the corresponding one of the first and second slide seats relative to the base.

The second casing of the display device further includes a receiving slot formed in the connecting side portion. Additionally, the computer apparatus further includes a rotation mechanism having a rotation seat that is accommodated by the receiving slot and that can rotate to project from the receiving slot. Further, the magnetic unit also has a magnet member fastened to the rotation seat.

Moreover, the rotation mechanism has a resilient member having a fixed end secured to the second casing and a rotary end secured to the rotation seat. The resilient member provides a restoring force for pivoting and retracting the rotation seat into the receiving slot. The second casing of the display device further has a first surface facing in the same direction as the display panel, a second surface opposite to the first surface, and a slot bottom surface parallel to the first surface, and a slot peripheral surfaces extending from the slot bottom surface to the first surface for defining the receiving slot. The rotation mechanism further has two spaced-apart fixed frames protruding from the slot bottom surface. The rotation seat has a block-shaped body situated between the two fixed frames, and two rotary shafts extending respectively from the two sides of the block-shaped body and connected respectively and pivotally to the fixed frames.

Additionally, the rotation seat of the rotation mechanism has a spring hole for accommodating the rotary end of the resilient member. The rotation mechanism includes a stop rib protruding from the slot bottom surface of the second casing and having one end adjacent to one of the two fixed frames for confining the fixed end of the resilient member between the stop rib and the one of the two fixed frames, thereby securing the fixed end of the resilient member to the second casing. The rotation mechanism further includes a limiting unit has a positioning peg that extends from a respective fastening unit and that limits the rotational angle of the rotation seat, and an arc-shaped positioning groove formed on an end of the block-shaped body for accommodating the positioning peg.

When the positioning peg is disposed at an end of the arc-shaped positioning groove, the rotation seat is accommodated by the receiving slot. When the positioning peg is disposed at an opposite end of the arc-shaped positioning groove, the rotary shafts project from the receiving slot.

The base includes a long, shallow groove formed in the upper surface of the first casing and extending in the front-rear direction for accommodating a ferromagnetic unit formed of an iron plate that corresponds in shape to the shallow groove. The magnetic unit of the display device is aligned with the shallow groove.

The magnetic attractive force between the magnetic unit and the ferromagnetic unit is nonpolar.

As such, the present invention relies on the magnetic attraction between a ferromagnetic unit on the first casing of the base and a magnetic unit situated in a corresponding position on the second casing of the display device to allow the display device to slide with respect to the base.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
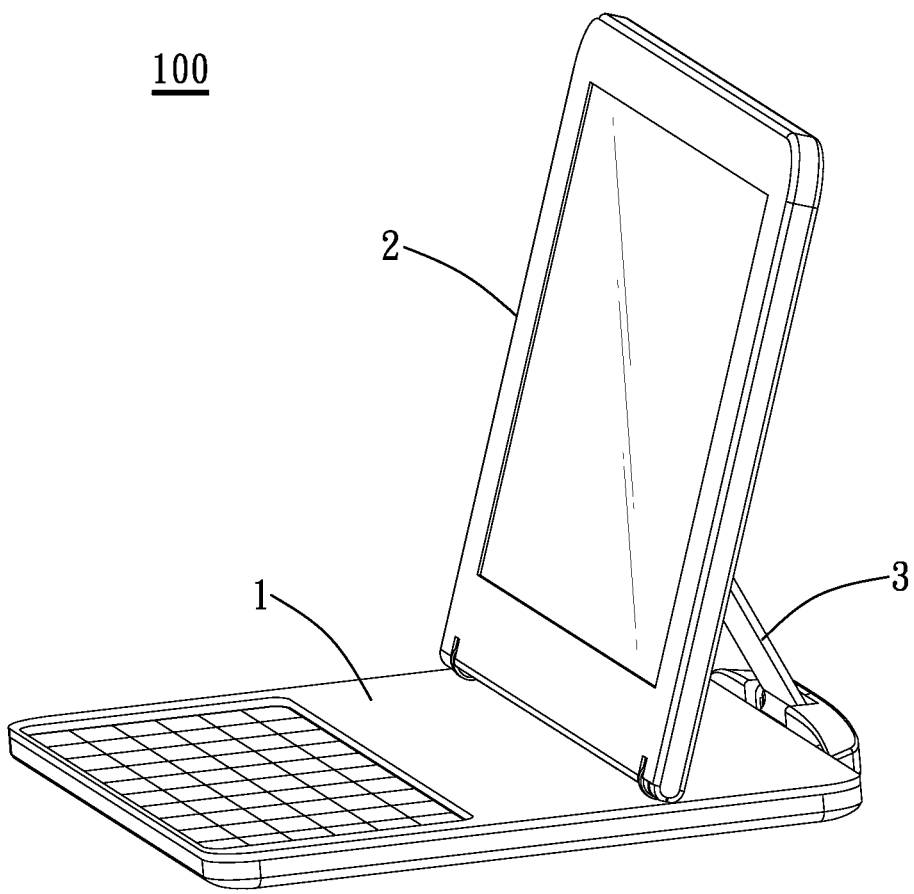
FIG. 1 is a perspective view of the first embodiment of a computer apparatus according to the present invention.

Before the present invention is described in greater detail, it should be noted that like elements are denoted by the same reference numerals throughout the disclosure.

With reference to FIG. 1, the first embodiment of a computer apparatus 100 of the present invention includes a base 1, a display device 2 situated on and above and slidable relative to the base 1, and a support frame 3 pivotally connected between the base 1 and the display device 2.

In this embodiment, as non-limiting examples, the display device 2 is a tablet PC, and the base 1 is an expansion keyboard for the tablet PC. Alternatively, the display device 2 may be the screen of a notebook computer and the base 1 a host of the notebook computer.

Figure 2:
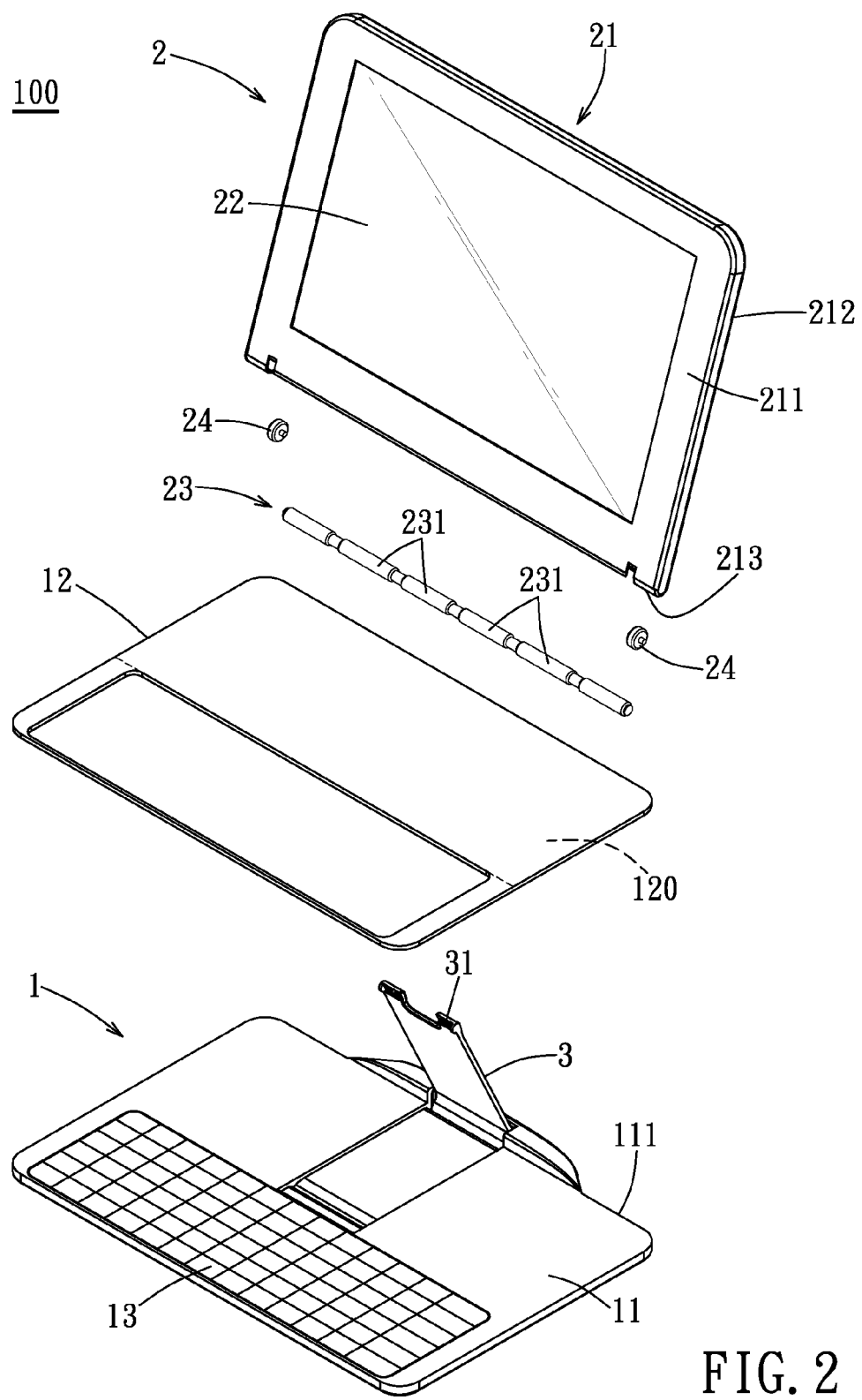
FIG. 2 is an exploded perspective view of the computer apparatus in FIG. 1.

With further reference to FIG. 2, the base 1 includes a first casing 11, a ferromagnetic unit, and a keyboard 13. In this embodiment, the ferromagnetic unit is an iron plate 12 disposed on and above the first casing 11, and has a primary portion 120 covering a rear portion of the first casing 11. Alternatively, the ferromagnetic unit may be an iron plate disposed on the underside of the first casing 11, or a magnetic layer disposed on the surface of the first casing 11, formed, for example, by electroplating, laying iron powder on or laying magnetic powder on the surface of the first casing, or using magnetic material for manufacturing the first casing 11 (i.e., unifying the first casing 11 and the ferromagnetic unit). The keyboard 13 is exposed from a front portion of the first casing 11.

The display device 2 includes a second casing 21, a display panel 22 exposed from the second casing 21, a magnetic unit 23 fastened to the second casing 21 and aligned with the iron plate 12 on the first casing 11, and a pair of spaced-apart wheels 24 situated at two sides of the magnetic unit 23, respectively.

Figure 4:
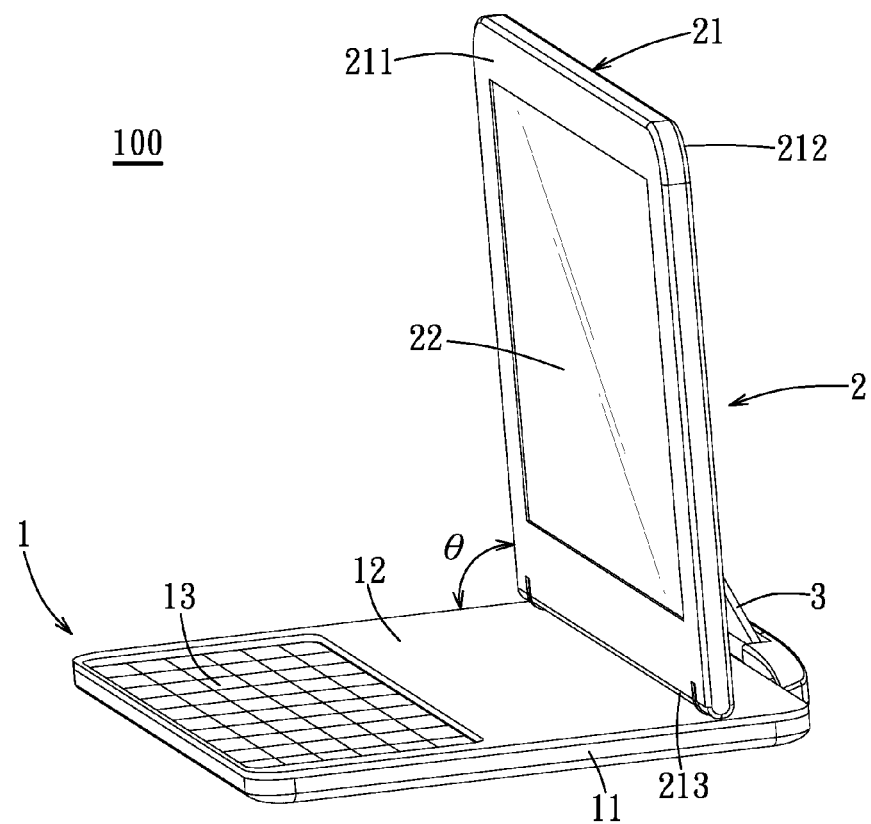
FIG. 4 to FIG. 6 are perspective views illustrating sliding movement of the computer apparatus from a first use state to a second use state.
Figure 5:
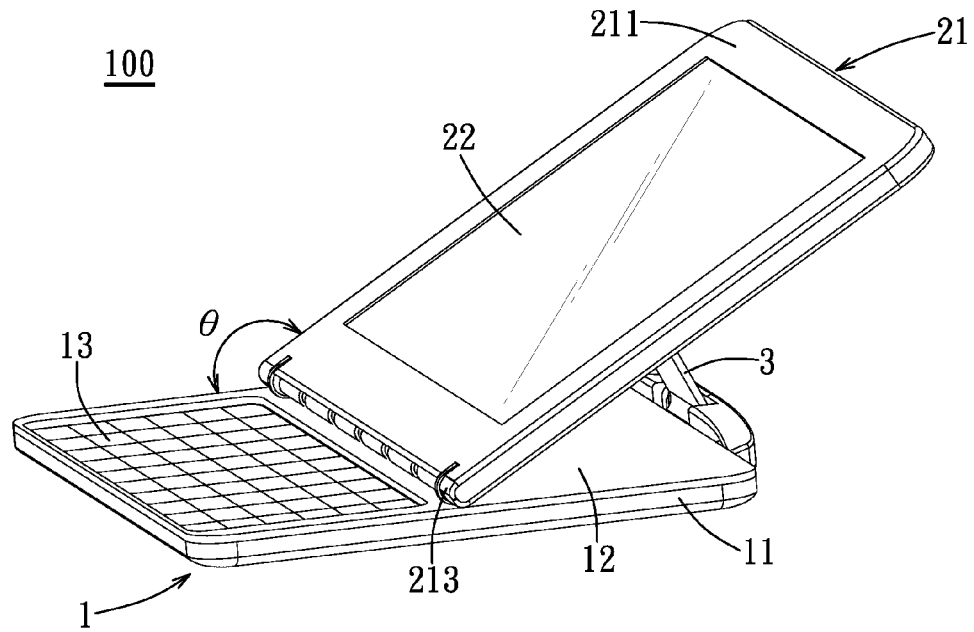
Figure 6:
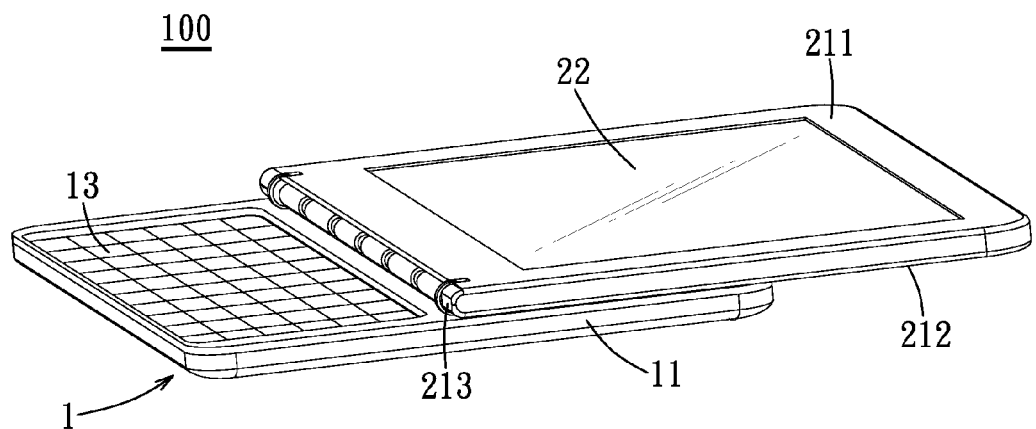

The second casing 21 has a first surface 211 facing in the same direction as the display panel 22, a second surface 212 opposite to the first surface 211, and a connecting side portion 213 adjacent to the first casing 11. With reference to FIGS. 4 and 5, when the computer apparatus 100 is in a first use state, the connecting side portion 213 of the second casing 21 adjoins an upper surface of the first casing 11, which forms an adjustable operational angle θ between zero and 180 degrees. With reference to FIG. 6, when the computer apparatus 100 is in a second use state, the second surface 212 of the second casing 21 lays flat against the first casing 11 of the base 1, in such a manner that the keyboard 13 remains exposed from the second casing 21, and the first surface 211 of the second casing 21 and the upper surface of the first casing 11 are parallel to each other. When the computer apparatus 100 is in a non-use state (not shown), the first surface 211 of the second casing 21 lays flat against the first casing 11 of the base 1 so that the angle θ is zero.

The magnetic unit 23 includes a plurality of cylindrical magnet members 231 affixed to the connecting side portion 213 of the second casing 21. Any two adjacent ones of the cylindrical magnet members 231 may abut against or spaced-apart from each other so long as the width of the iron plate 12 is not less than the overall width of an assembly of the plurality of cylindrical magnet members 231.

Figure 3:
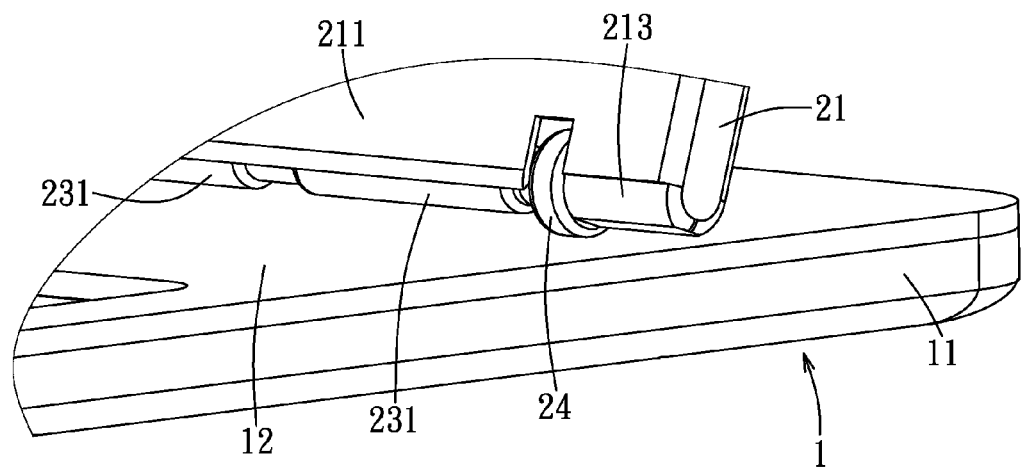
FIG. 3 is an enlarged fragmentary perspective view of the connection between a display device and a base of the embodiment of FIG. 1.

The wheels 24 are installed on the connecting side portion 213 of the second casing 21, and are located at two sides of the magnetic unit 23 for facilitating sliding movement of the display device 2 relative to the base 1. The cylindrical magnet members 231 are flush against the surface of the connecting side portion 213, and are magnetically attracted to the iron plate 12, thus drawing the first casing 11 and the second casing 21 together. Because each wheel 24 protrudes slightly from the connecting side portion 213 (see FIG. 3), and because the cylindrical magnet members 231 are flush against the connecting side portion 213, only the wheels 24 of the display device 2 make contact with the base 1, which allows the display device 2 to slide more easily with respect to the base 1.

Figure 10:
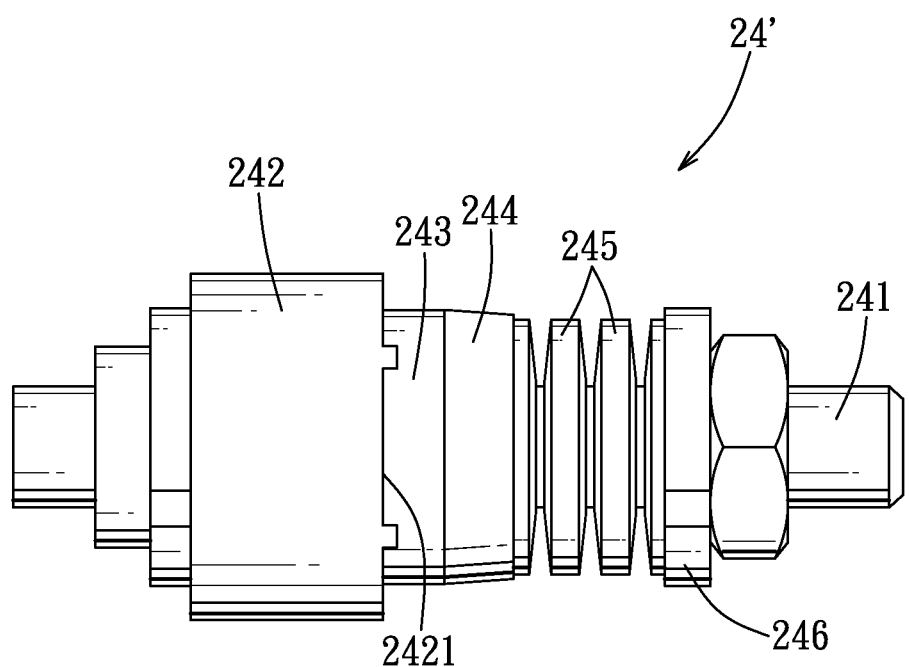
FIG. 10 is an enlarged view of a variant of a wheel used in the first embodiment.

Alternatively, with reference to FIGS. 2 and 10, this embodiment may use wheels 24' as shown in FIG. 10 that have torque instead of the torqueless wheels as shown in FIG. 2. A display device using the wheels 24' can slide at a controlled speed and maintain a desired position due to the resistance created in the wheels 24'.

Specifically, each wheel 24' has an axle 241 fixed to the second casing 21, a rotary body 242 sleeved rotatably on the axle 241, a first frictional pad 243 affixed to a side surface 2421 of the rotary body 242, a second frictional pad 244 fixedly sleeved on the axle 241 for providing frictional resistance against the first frictional pad 243, a plurality of leaf springs 245 sleeved on the axle 241 and adjacent to the second frictional pad 244, and a retainer unit 246 for retaining the rotary body 242, the first frictional pad 243, the second frictional pad 244, and the leaf springs 245 along the axle 241 together. The retaining unit 246 is operable to adjust the biasing force of the left spring 245 for pressing the second frictional pad 244 against the first frictional pad 243.

The support frame 3 is pivotally connected to a rear end 111 of the first casing 11 of the base 1 at an end thereof, and has a free end 31 extending toward the display device 2. The free end 31 is pivotally connected to the second surface 212 of the second casing 21. In this embodiment, at least one of the pivotal connections between the support frame 3 and the display device 2 and between the support frame 3 and the base 1 utilizes a torque control mechanism, such as friction pads (not shown), to increase the frictional resistance between the connected elements, to maintain the relative positions of the display device 2 and the base 1, thereby facilitating angle adjustment of the display device 2.

Figure 8:
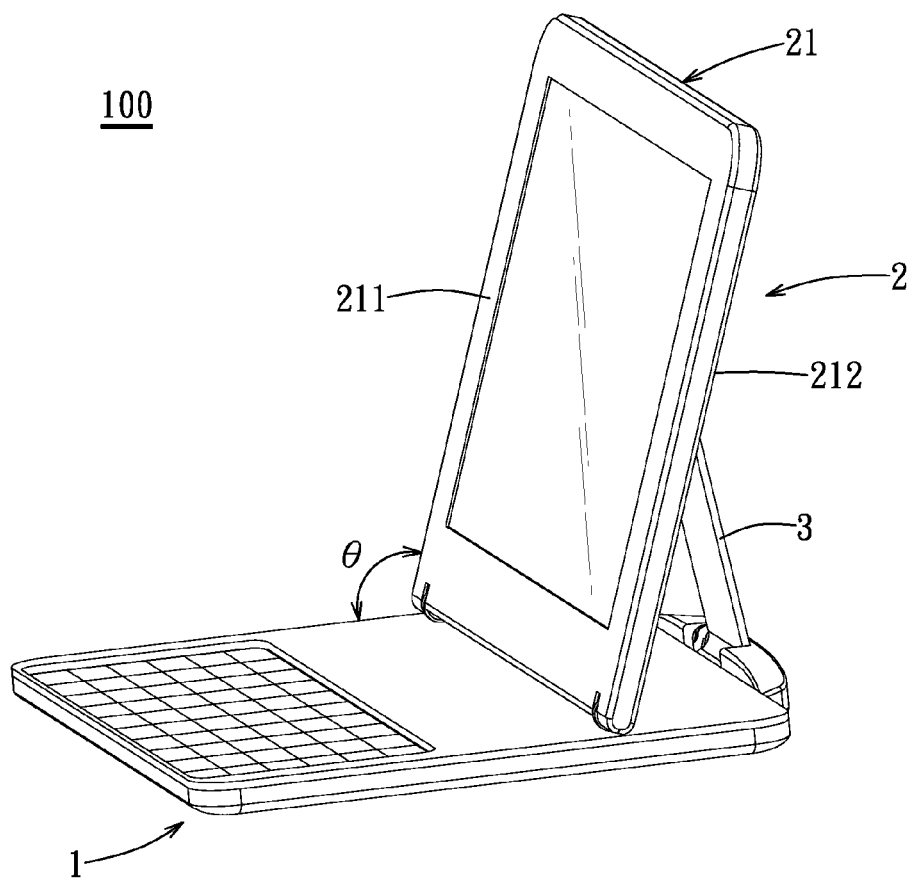
FIG. 8 and FIG. 9 are perspective views of a variant of the first embodiment, wherein the display device completely covers the base at a second use state.
Figure 9:
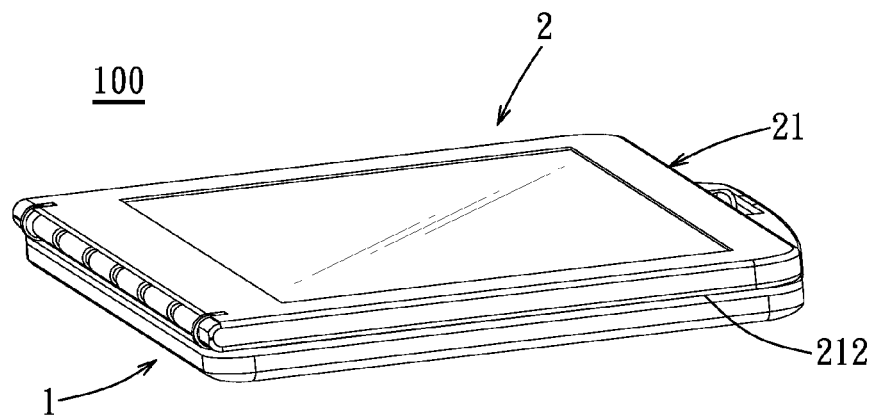

With reference to FIGS. 8 and 9, the length of the support frame 3 in this embodiment may be modified to be longer than shown in FIGS. 5 and 6. In the first use state of the computer apparatus 100 (see FIG. 8), the first surface 211 of the second casing 21 and the first casing 11 of the base 1 form an angle θ. In the second use state of the computer apparatus 100 (see FIG. 9), the second surface 212 of the second casing 21 lays flat against and completely covers the first casing 11 of the base 1 such that the keyboard 13 is also covered.

Figure 7:
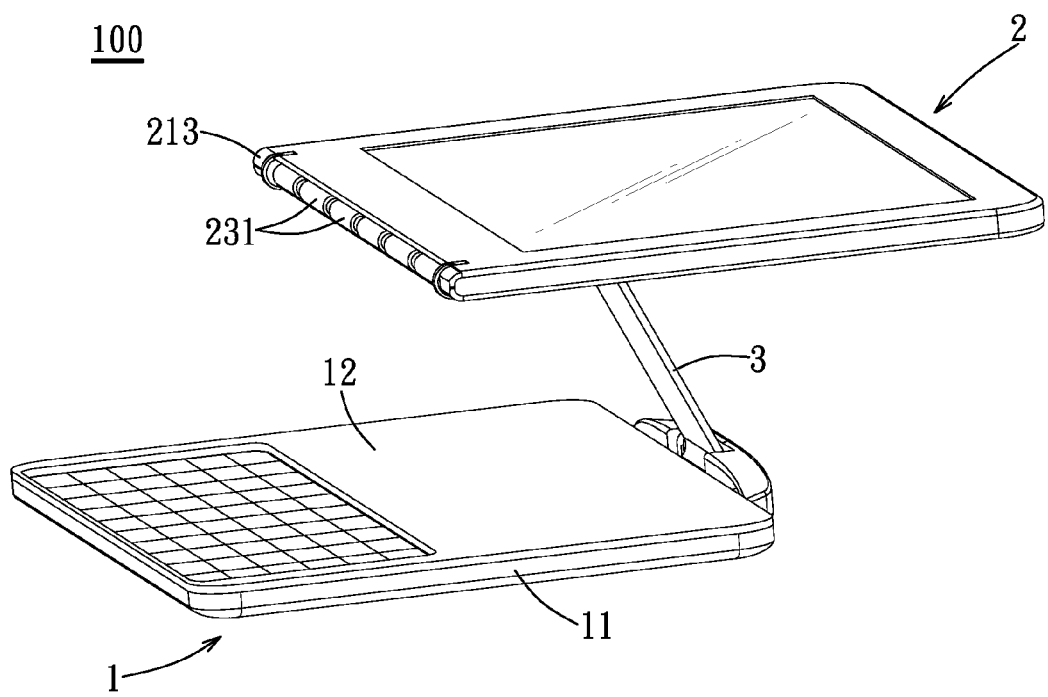
FIG. 7 is a perspective view showing the computer apparatus with the display device separated from the base.

With reference to FIG. 7, using a tablet PC as an example of the display device 2, when the user desires to remove the display device 2 from the base 1, he/she need only overcome the magnetic attractive force between the plurality of cylindrical magnet members 231 and the iron plate 12. The support frame 3 is detachable from the display device 2, allowing the second casing 21 of the display device 2 to completely separate from the first casing 11 of the base 1.

Figure 11:
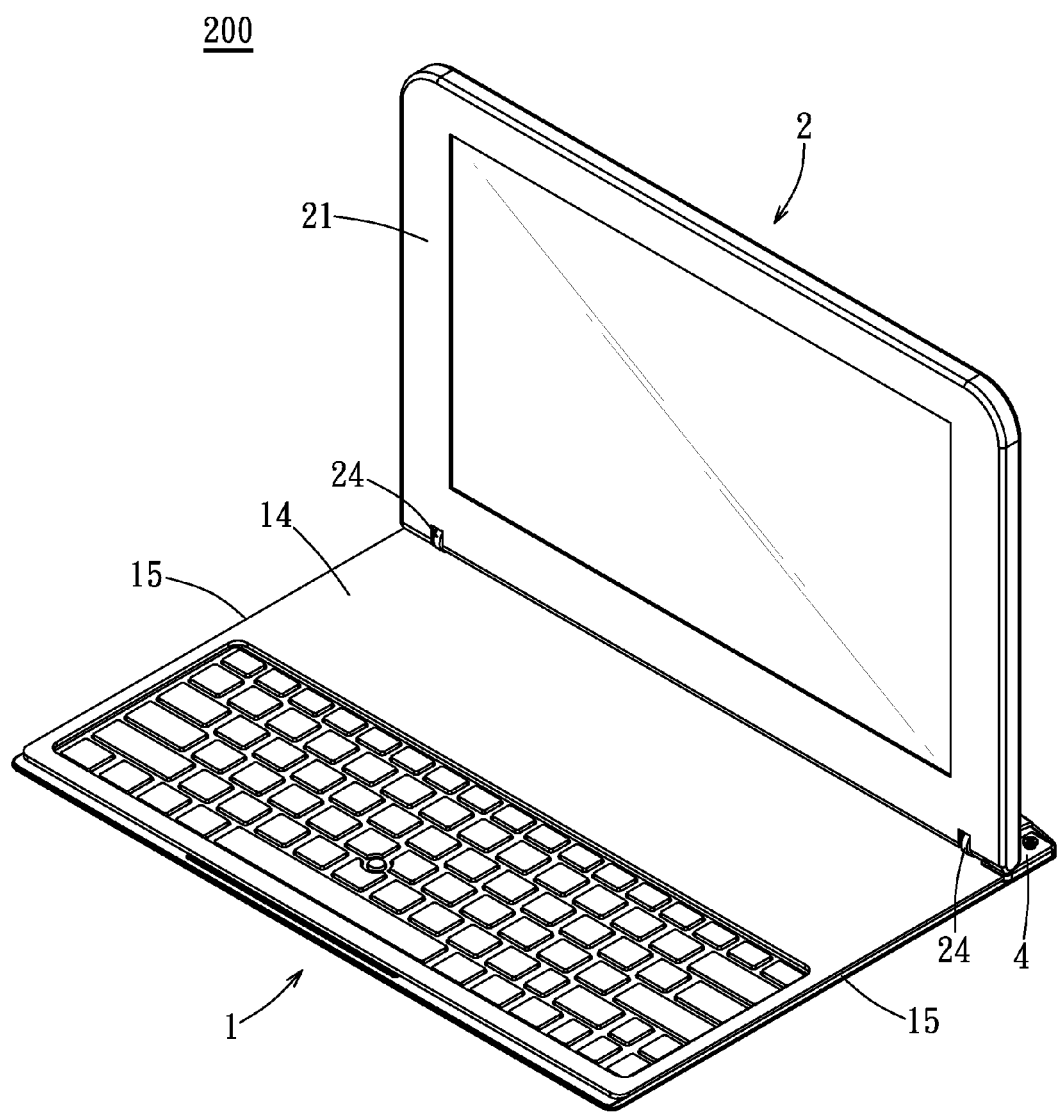
FIG. 11 is a perspective view of the second embodiment of a computer apparatus according to the present invention.
Figure 12:
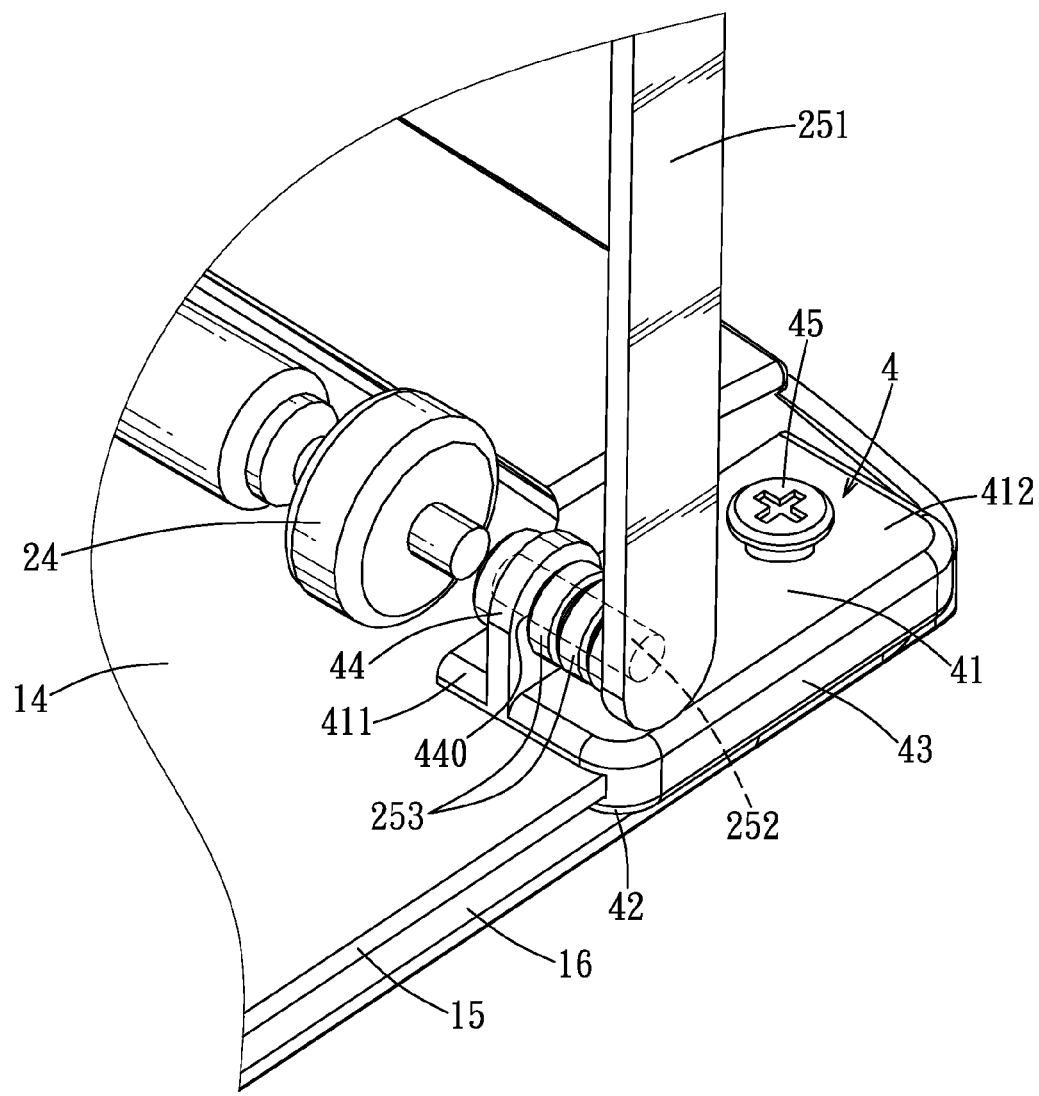
FIG. 12 is an enlarged fragmentary perspective view illustrating a connection between a slide seat and a base.

With reference to FIGS. 11 and 12, the second embodiment of the present invention is similar to the first embodiment, except that the computer apparatus 200 includes first and second slide seats 4, and does not include a support frame 3 (see FIG. 1). The slide seats 4 are disposed respectively on first and second opposing sides of the base 1, and are pivotally connected to the display device 2.

Specifically, for engaging the first and second slide seats 4, the base 1 includes an upper surface 14, first and second side surfaces 15 connected to the sides of the upper surface 14, respectively, and first and second slide slots 16 formed respectively along the first and second side surfaces 15 in the front-to-rear direction. Each of the first and second slide seats 4 is slidable within the corresponding one of the first and second slide slots 16, and has an upper plate body 41 disposed on and above the upper surface 14 of the base 1, a lower plate body 42 extending into the corresponding one of the first and second slide slots 16, a connecting plate body 43 connecting the upper plate body 41 to the lower plate body 42, and a bearing 44 that protrudes upwards out of a front end 411 of the upper plate body 41 and that has a hole 440 extending through the bearing 44 in a left-to-right direction.

The display device 2 also includes first and second side support rods 251 fixedly and respectively coupled to first and second opposing sides of the second casing 21, first and second pivot rods 252 protruding respectively from the first and second side support rods 251 toward each other, adjacent to the connecting side portion 213 of the second casing 21, and extending respectively through the holes 441 of the bearings 44, and a plurality of washers 253 sleeved on each of the first and second pivot rods 252. At least two of the washers 253 are clamped between the corresponding bearing 44 and the corresponding one of the first and second side support rods 251 to provide frictional resistance against pivotal movement of the display device 2 such that, when no force is exerted against the display device 2, the operational angle with respect to the base 1 can be maintained. To adjust the operational angle between the base 1 and the display device 2, a user must overcome the frictional resistance between the washers 253, the side support rods 251, and the bearings 44.

Additionally, each of the first and second slide seats 4 further has a lock bolt 45 that extends through a rear end 412 of the upper plate body 41 for maintaining the position of the corresponding one of the first and second slide seats 4 relative to the base 1. When display device 2 together the first and second slide seats 4 is moved to a desired position, the lock bolt 45 is operable to lock the display device 2 on the base 1.

Importantly, the wheels 24 of the previous embodiments may also be integrated with the magnetic unit 23, for example, by installing one or many magnet pieces (not shown) on or within each wheel 24. By housing a magnet piece within the wheel 24, the wheel 24 is able to not only slide with respect to the base 1, but also generate a magnetic force with respect to the base 1, thus negating the need for a separate magnetic unit 23 on the connecting side portion 213 of the display device 2.

Figure 13:
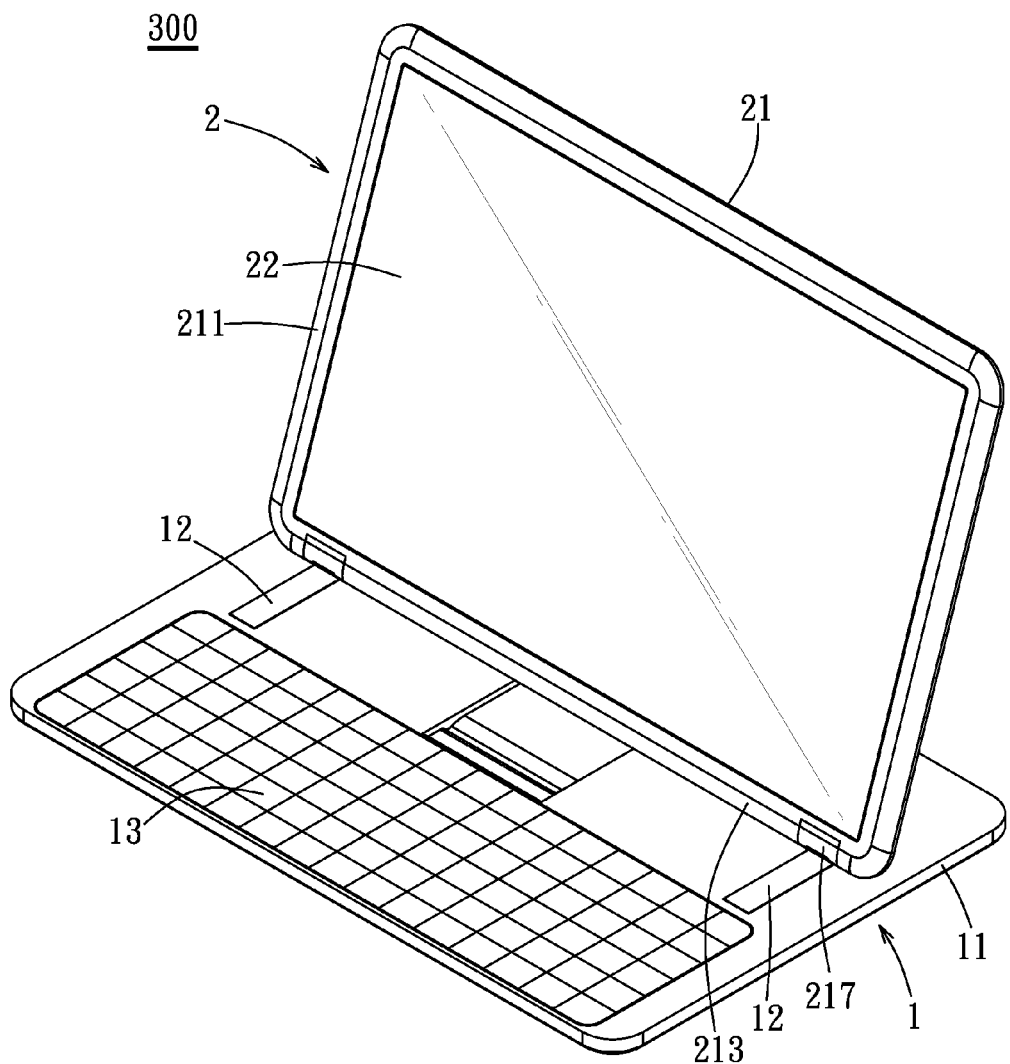
FIG. 13 is a perspective view of the third embodiment of a computer apparatus according to the present invention.
Figure 14:
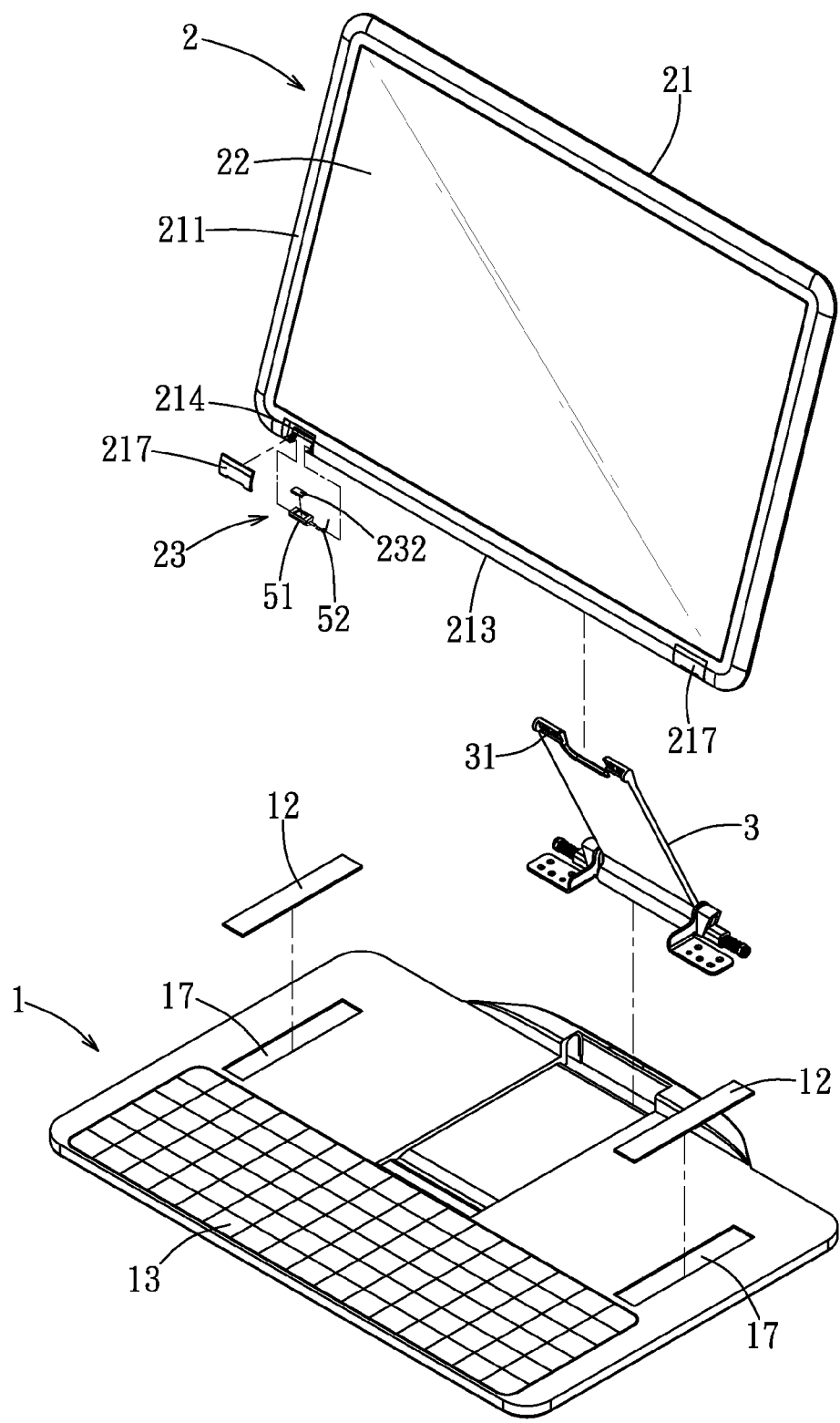
FIG. 14 is an exploded perspective view of the third embodiment.

With reference to FIGS. 13 and 14, the third embodiment of a computer apparatus 300 of the present invention is similar to the first embodiment, except that the display device 2 includes a mobile magnetic unit 23. To clarify, the display device 2 uses a rotatable magnetic unit 23 to both maintain its position and adjust its angle by sliding relative to the base 1. The wheels 24 of the first embodiment may still be used to facilitate relative sliding movement between the display device 2 and the base 1. Alternatively, it is also possible to omit the wheels 24 from the display device 2 and depend primarily on the magnetic unit 23 to maintain contact between the display device 2 and the base 1 for allowing relative sliding movement thereof.

It should be noted that the following description of the magnetic unit 23, the ferromagnetic unit, and an associated rotating means of the magnetic unit 23 is of a symmetrical design, but this does not limit the scope of this invention thereto. For example, the computer apparatus 100 may includes only a single magnet 232 installed in the middle of the display device 2 and the base 1, and a single iron plate 12 disposed on the middle of the base 1.

The base 1 includes a pair of shallow grooves 17 disposed respectively in two sides of the upper surface 14 of the first casing 11 and each extending in the front-to-rear direction for accommodating an iron plate 12. Each magnetic unit 23 of the display device 2 is positioned accordingly to attract the corresponding iron plate 12 housed by the corresponding shallow groove 17. Alternatively, as in the first embodiment, each ferromagnetic unit may include an iron plate disposed on the underside of the first casing 11, a magnetic layer disposed on the surface of the first casing 11, for example, by electroplating, laying iron powder on or laying magnetic powder on the surface of the first casing, or unification of the first casing 11 and the ferromagnetic unit by using a magnetic material to manufacture the first casing 11.

Figure 15:
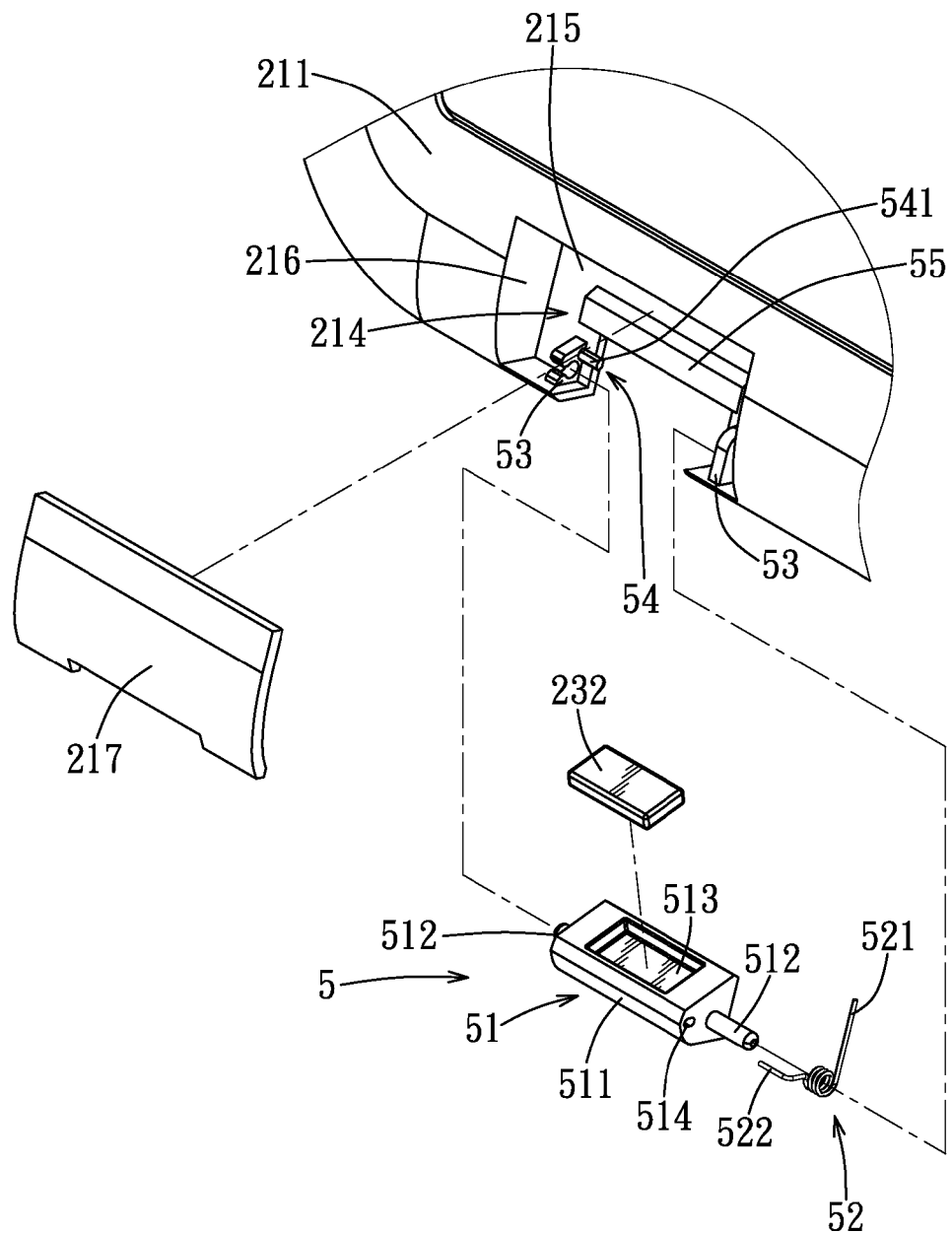
FIG. 15 is an enlarged, exploded y perspective view of a rotation mechanism of the third embodiment 3.

With reference to FIG. 15, the second casing 21 of the display device 2 of the third embodiment also has a pair of spaced-apart receiving slots 214 formed respectively at the left and right ends of the connecting side portion 213 and a pair of slot covers 217 for covering the receiving slots 214, respectively. Each receiving slot 214 is defined by a slot bottom surface 215 parallel to the first surface 211, and a slot peripheral surface 216 extending from a periphery of the slot bottom surface 215 to the first surface 211 and aligned with the corresponding shallow groove 17.

The computer apparatus 300 further includes a pair of rotation mechanisms 5 respectively installed in the receiving slots 214. Each rotation mechanism 5 has a rotation seat 51 that is accommodated by the corresponding receiving slot 214 and that can rotate to project from the receiving slot 214, a resilient member 52, two spaced-apart fixed frames 53 protruding from the slot bottom surface 215, a limiting unit 54 for limiting the rotational angle of the rotation seat 51, and a stop rib 55 protruding from the slot bottom surface 215 of the second casing 21 that has one end adjacent to one of said two fixed frames 53.

Each rotation seat 51 has a block-shaped body 511 situated between the two fixed frames 53, two rotary shafts 512 extending respectively from the two sides of the block-shaped body 511 away from each other and connected respectively to the fixed frames 53, amounting slot 513 formed in the block-shaped body 511, and a spring hole 514 formed in one side of the block-shaped body 511 (shown at the right side of FIG. 15).

The magnetic unit 23 in this embodiment includes two magnet members 232 secured respectively in the mounting slots 513 of the rotation seats 51. The positions of the magnet members 232 correspond respectively with those of the iron plates 12 in the shallow grooves 17. When the ferromagnetic unit is of a different design, the positions of the iron plates 12 may be adjusted accordingly. Additionally, the shape of the magnet members 232 and the manner in which they are secured are not limited by those which are shown in the figures or what is discussed above, so long as the magnet members 232 are fastened respectively to the rotation seats 51.

The resilient member 52 of each rotation mechanism 5 includes a rotary end 522 inserted into the spring hole 514 of the corresponding rotation seat 51 and a fixed end 521 affixed to the second casing 21 of the display device 2. As such, each of the resilient members 52 provides a restoring force for pivoting and retracting the corresponding rotation seat 51 into the corresponding receiving slot 214. The fixed end 521 of each resilient member 52 is confined between one end of the stop rib 55 and the adjacent fixed frame 53, thereby securing the fixed end 521 of the corresponding resilient member 52 to the second casing 21.

Figure 16:
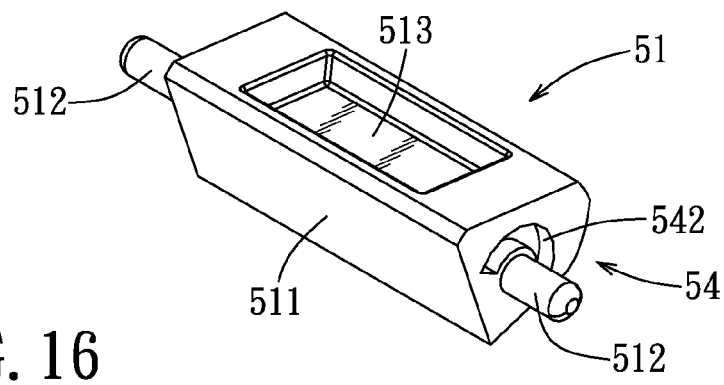
FIG. 16 is an enlarged perspective view of a block-shaped body of a rotation mechanism viewed from an angle different from that in FIG. 15.
Figure 17:
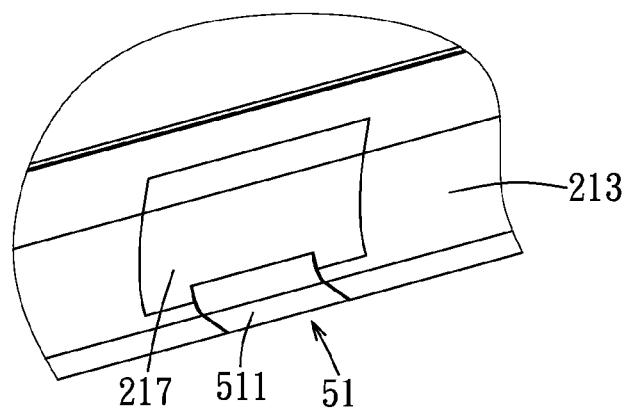
FIG. 17 and FIG. 18 are enlarged fragmentary perspective views of the rotation mechanism in the retracted and extended states, respectively.
Figure 18:
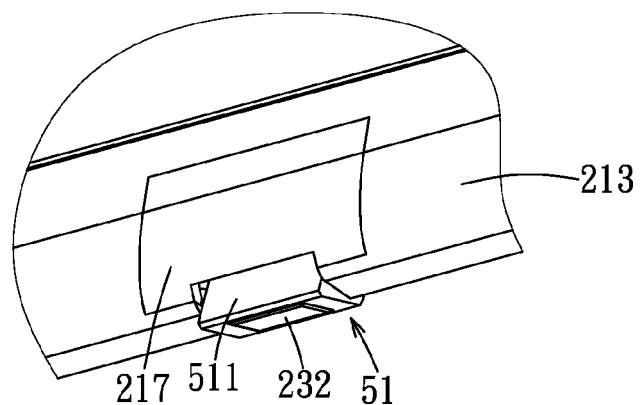

With reference to FIGS. 15 and 16, the limiting unit 54 of each rotation mechanism 5 has a positioning peg 541 extending from one of the fastening units 53, and an arc-shaped positioning groove 542 formed in a side of the block-shaped body 511 of the corresponding rotation seat 51 for receiving the positioning peg 541 Such that, when the positioning peg 541 is disposed at an end of the positioning groove 542, the corresponding rotation seat 51 is completely accommodated within the receiving slot 214, as shown in FIG. 17. When the positioning peg 541 is disposed at an opposite end of the positioning groove 542, the corresponding rotation seat 51 projects from the receiving slot 214 as shown in FIG. 18. At most, the rotary pegs 512 can rotate to the opposite end of the arc-shaped positioning groove 542, which thus limits the ability of the rotation seat 51 to leave the receiving slot 214.

As in the first embodiment, the display device 2 is detachable from the support frame 3. With reference to FIGS. 14, 17 and 18, when the display device 2 is a tablet PC and used independently from the base 1, the rotation seat 51 is biased by the resilient member 52 to rotate into a completely concealed state (i.e., rotate completely into the corresponding receiving slot 214), as in FIG. 17, so as to maintain the outer appearance of the tablet PC. If the rotation seat 51 approaches to the ferromagnetic unit (such as an iron plate 12), it will rotate in the corresponding receiving slot 214 due to the magnetic attractive force between the magnet members 232 and the ferromagnetic unit.

Figure 19:
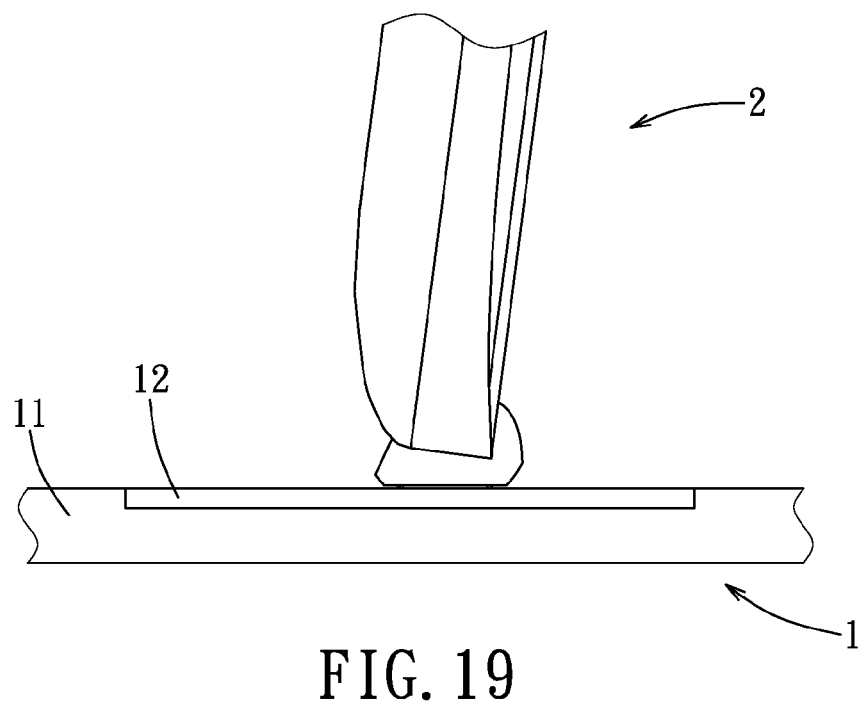
FIG. 19 and FIG. 20 are side views illustrating the ability to adjust the operational angle of the display device with respect to the base.
Figure 20:
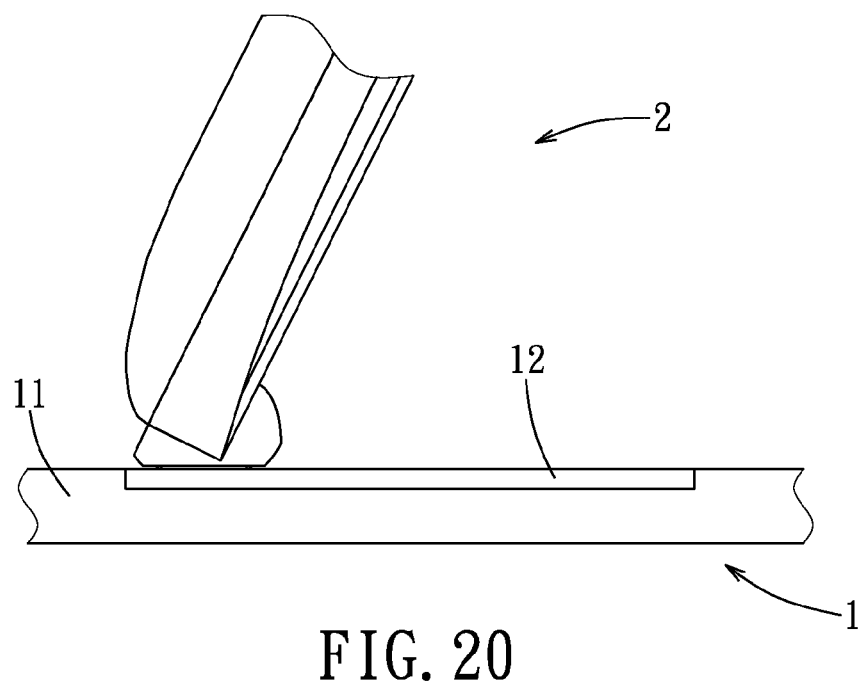

With reference to FIGS. 14, 19 and 20, when the magnet members 232 of the display device 2 attract the iron plates 12 of the base 1, the display device 2 may be operated to allow the connecting side portion 213 to slide back and forth along the iron plates 12 to adjust the operational angle, as shown in FIGS. 19 and 20. As in the first embodiment, the operational angle of the display device 2 in this embodiment is maintained by the torque control of the support frame 3. However, maintenance of the operational angle should not be limited to torque control of the support frame 3. Alternatively, the torque design may be a resistance device implemented in the rotation mechanism 5.

To sum up, the present invention combines a ferromagnetic unit disposed on the first casing 11 of the base 1 with a magnetic unit 23 disposed on the second casing 21 of the display device 2, and uses the attractive force between the ferromagnetic unit and the magnetic unit to facilitate relative sliding movement between the base 1 and the display device 2. Of course, as can easily be seen by one skilled in the art, the positions of the ferromagnetic unit and the magnetic unit 23 are interchangeable. That is, the ferromagnetic unit is disposed on the second casing 21 and the magnetic unit 23 is disposed on the first casing 11. Additionally, the magnetic attractive force between the magnetic unit 23 and the ferromagnetic unit does not depend on polarity. This means that if the magnetic unit 23 has north and south poles, the ferromagnetic unit can be manufactured from nonpolar, magnetically attractable material in the form of iron plate 12 or iron powder. This allows the magnetic unit 23 and ferromagnetic unit continuously attract rather than attract and repulse each other, which maintains stable and steady relative sliding movement between the base 1 and the display device 2.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A computer apparatus, comprising:
    a base including a first casing and a ferromagnetic unit disposed on said first casing and extending along a front-rear direction;
    a display device which is disposed on and above said base and which is capable of sliding relative to said base along the front-rear direction, said display device including
        (a) a second casing having a connecting side portion that is adjacent to said base when said computer apparatus is in a first use state, where an angle formed between said first and second casings is adjustable,
        (b) a display panel installed on said second casing, and
        (c) a magnetic unit disposed on said connecting side portion of said second casing such that a magnetic attractive force is created and maintained along the front-rear direction between said ferromagnetic unit and said magnetic unit so as to allow for relative sliding movement between said base and said display device, while preventing separation of said display device from said base; and
    first and second slide seats which are disposed, respectively, on first and second sides of said base and which are slidable relative to said base, said display device being pivotally coupled to said first and second slide seats, wherein said display device further includes a plurality of wheels installed on said connecting side portion of said second casing, said wheels are integrated with said magnetic unit, and said wheels partially protrude from said connecting side portion for facilitating sliding movement of said display device relative to said base so that said wheels rolls and moves in said front-rear direction along with said connecting side portion of said display device.

2. The computer apparatus as recited in claim 1, wherein said first casing of said base comprises:
    an upper surface;
    first and second side surfaces connected, respectively, to first and second opposing sides of the upper surface; and
    first and second slide slots formed in said first and second side surfaces, respectively, and extending in the front-rear direction.

3. The computer apparatus as recited in claim 2, wherein each of said first and second slide seats comprises:
    an upper plate body superposed on said upper surface of said first casing;
    a lower plate body extending into a respective one of said first and second slide slots; and
    a connecting plate body connecting said upper plate body to said lower plate body.

4. The computer apparatus as recited in claim 3, wherein each of said first and second slide seats is equipped with a bearing disposed on said upper plate body, said bearing having a hole extending therethrough.

5. The computer apparatus as recited in claim 4, wherein said display device further includes:
    first and second side support rods respectively and fixedly coupled to first and second opposing sides of said second casing.

6. The computer apparatus as recited in claim 5, wherein said display device further includes:
    first and second pivot rods protruding respectively from said first and second side support rods toward each other and adjacent to said connecting side portion of said second casing; and
    a plurality of washers sleeved on each of said first and second pivot rods such that at least two of said washers are clamped between a corresponding one of said bearings and a corresponding one of said first and second side support rods to provide a frictional resistance therebetween to maintain an angular position of said display device with respect to said base.

7. The computer apparatus as recited in claim 6, wherein said bearings are disposed respectively on front ends of said upper plate bodies of said first and second slide seats.

8. The computer apparatus as recited in claim 7, wherein each of said first and second slide seats is further equipped with a lock bolt extending through a rear end of said upper plate body of a responding one of said first and second sliding seats for maintaining a position of the corresponding one of said first and second slide seats relative to said base.

9. The computer apparatus as recited in claim 1, wherein each of said wheels has:
    an axle;
    a rotary body sleeved rotatably on said axle;
    a first frictional pad affixed to a side surface of said rotary body;
    a second frictional pad fixedly sleeved on said axle for providing frictional resistance against said first frictional pad;
    a plurality of leaf springs sleeved on said axle and adjacent to said second frictional pad; and
    a retainer unit for retaining said rotary body, said first frictional pad, said second frictional pad and said leaf springs together along said axle.

10. The computer apparatus as recited in claim 9, wherein each of said wheels has torque.

11. The computer apparatus as recited in claim 1, wherein the magnetic attractive force between said magnetic unit and said ferromagnetic unit is nonpolar.

\* \* \* \* \*